United States Patent [19]

Rees

[11] Patent Number: 5,292,164

[45] Date of Patent: Mar. 8, 1994

[54] POWER SEAT ADJUSTER WITH HORIZONTAL SLOT DRIVE

[75] Inventor: Richard W. A. Rees, Rochester Hills, Mich.

[73] Assignee: ITT Corporation, New York, N.Y.

[21] Appl. No.: 995,983

[22] Filed: Dec. 23, 1992

[51] Int. Cl.[5] .............................................. B60N 1/02
[52] U.S. Cl. .................................. 296/65.1; 248/429; 384/25
[58] Field of Search ............... 296/65.1; 248/429, 394, 248/396; 384/25, 26

[56] References Cited

U.S. PATENT DOCUMENTS

| | | | |
|---|---|---|---|
| 4,438,895 | 3/1984 | Rees | 248/396 |
| 4,445,661 | 5/1984 | Langmesser, Jr. et al. | 248/394 |
| 4,463,922 | 8/1984 | Rees | 248/429 |
| 4,478,383 | 10/1984 | Urai | 248/429 |
| 4,487,459 | 12/1984 | Rees | 384/7 |
| 4,513,937 | 4/1985 | Langmesser, Jr. et al. | 248/394 |
| 4,527,767 | 7/1985 | Rees | 248/419 |
| 4,563,044 | 1/1986 | Rees | 384/18 |
| 4,580,755 | 4/1986 | Rees | 248/430 |
| 4,726,617 | 2/1988 | Nishimura | 296/65.1 |
| 4,756,503 | 7/1988 | Fujita | 296/65.1 X |
| 4,821,991 | 4/1989 | Aihara et al. | 248/430 |
| 4,860,988 | 8/1989 | Rees et al. | 248/420 |
| 4,948,189 | 8/1990 | Terada et al. | 296/65.1 |
| 4,969,622 | 11/1990 | Münchow et al. | 248/429 |
| 4,981,278 | 1/1991 | Rees | 248/430 |
| 5,048,787 | 9/1991 | Saitoh | 248/430 |
| 5,048,886 | 9/1991 | Ito et al. | 296/65.1 |

*Primary Examiner*—Robert R. Song
*Attorney, Agent, or Firm*—Robert P. Seitter; J. Gordon Lewis

[57] ABSTRACT

A power seat adjuster includes first and second spaced track assemblies, each formed of an upper track slidably mounted on a lower track anchored to a vehicle floor. A drive block disposed in each upper track rotatably engages a lead screw bi-directionally rotated by a drive transmission coupled to the output shaft of a horizontal drive motor mounted between the track assemblies. A drive block mounting bracket supports each drive block and has a leg extending through an elongated slot in the upper track and an aperture in the lower tracks to a fixed connection to the lower track. A seat support plate is disposed adjacent each upper track and is connected to a seat. A pair of vertical drive motors are each coupled through a lead screw, a rotatable shaft and pivot links to opposite ends of the seat support plates for selectively varying the vertical position of the ends of the seat support plates with respect to the track assemblies.

38 Claims, 8 Drawing Sheets

POWER SEAT ADJUSTER WITH HORIZONTAL SLOT DRIVE

BACKGROUND OF THE INVENTION

1. Field of the Invention

The present invention relates, in general, to vehicle seats and, more specifically, to power seat adjusters for vehicle seats.

1. Description of the Art

Power seat adjusters are available on many automotive vehicles. Such power seat adjusters are primarily used on the driver's seat and, occasionally, also on the front passenger seat of the vehicle.

Power seat adjusters typically carry an upper support frame or support members which engage and support the seat bottom of a vehicle seat. The upper support members are mounted on first and second, spaced track assemblies, each formed of an upper track which is connected to the upper support members and which is also slidably mounted in a lower track anchored to the vehicle floor. A drive mechanism, typically formed of a bi-directional electric motor mounted on the power seat adjuster, rotates a pair of drive shafts extending outward from the motor to a gear assembly or gear box mounted in each upper track. In one arrangement, the gear box rotates a lead screw extending along each upper track. A drive block connected by a bracket extending outward from the upper track and downward to a fixed connection with the lower track threadingly receives the lead screw to cause reciprocal movement of the upper track and the attached upper support member upon selective direction energization of the drive motor. Other drive motors may also be incorporated into the power seat adjuster to provide vertical movement of the front or back or both ends of the upper support members as well as pivotal movement of the seat back with respect to the seat bottom.

In certain vehicle configurations, interior space for mounting a vehicle seat having a power seat adjuster is constricted or limited, particularly in height. Such vehicle configurations have previously required a manual seat adjuster due to the larger height requirement of power seat adjusters employing electric drive motors and interconnecting drive shafts, links, lead screws, etc. This is particularly the case in power seat adjusters having a bracket attached to a drive nut mounted on a lead screw in an upper track which extends outward from the upper track and then downward to a fixed engagement at one end to the lower track.

Thus, it will be desirable to provide a power seat adjuster for a vehicle seat which has a minimal height so as to be usable in a wide variety of vehicle configurations. It would also be desirable to provide a power seat adjuster having at least horizontal fore and aft movement which has improved mechanical response and a reduced cost compared to previously devised power seat adjusters.

SUMMARY OF THE INVENTION

The present invention is a power seat adjuster for a vehicle seat which provides at least bi-directional horizontal fore and aft movement and, preferably, vertical movement including pivoting of the front and/or rear portions of a seat.

The power seat adjuster of the present invention includes a pair of track assemblies which are mounted in a spaced apart manner on a vehicle floor and support a seat bottom of a vehicle seat thereon. Each track assembly includes a lower track and means for stationarily securing the lower track to the vehicle floor. An upper track is slidably mounted on each lower track. An elongate slot is formed in and extends through each upper track. A lower track coupler has a leg extending through the slot in the upper track which is fixedly connected to the lower track. An extensible means is stationarily coupled at one portion to the lower track coupler. A horizontal drive means is stationarily mounted to the upper track and has a rotatable output element engaged with another portion of the extensible means for bi-directionally driving the extensible means with respect to the lower track coupler to horizontally move each upper track with respect to each lower track.

In one embodiment, the extensible means comprises a lead screw is mounted on each upper track and connected to and bi-directionally rotated by the output element of the drive means. The lower track coupler includes a drive block threadingly engaging the lead screw. A drive block bracket fixedly supports the drive block. The drive block bracket has a leg which extends through the slot in the upper track and is fixedly connected at one end to the lower track such that the drive block and the drive block bracket are stationarily fixed with respect to the upper track and rotation of the lead screw by the drive means causes sliding movement of the upper track along the lower track. Further, a horizontal drive means, which is mounted between the pair of track assemblies, has a pair of rotatable output shafts connected to a horizontal drive transmission means fixedly mounted in each track assembly for bi-directionally horizontally moving the upper tracks of each track assembly in unison.

In a preferred embodiment, the upper track of each track assembly includes a central base and a pair of side walls extending vertically therefrom which form an interior channel extending along the length of the upper track. The lead screw, the drive block and the drive block bracket are disposed in the channel in each upper track. The lower track preferably includes an upper portion having opposed, outwardly extending flanges. A leg depends from the upper portion of the lower track. An aperture is formed in and extends through the upper portion of each lower track. The depending leg of the drive block bracket extends through the aperture and is fixedly connected at one end to the depending leg of the lower track.

In a preferred embodiment, the upper track and the lower track of each track assembly are formed as extrusions of a lightweight, high strength material, such as aluminum.

In an exemplary embodiment, the power seat adjuster of the present invention includes a pair of elongated plates, one of which is disposed adjacent to the upper track of each track assembly. Each plate has first and second ends. First and second means are provided for vertically moving the first and second ends of the plates of each track assembly, respectively, between a plurality of user selectible positions. The first vertical moving means includes a first shaft rotatably mounted in and extending between one end of the upper tracks of the pair of track assemblies. A first vertical drive means is mounted between the pair of track assemblies and is connected to the first shaft for bi-directionally rotating the first shaft. A first link means is coupled between the first shaft and a first end of each of the plates for transmitting rotation of the first shaft to vertical displacement of the first end of the plates with respect to the track assemblies. A similar second vertical drive means is provided for the opposite ends of the plates and functions in a similar manner to provide selectible vertical movement of the second end of the plates in unison with respect to the track assemblies.

The power seat adjuster of the present invention has a minimal vertical height as compared to previously devised power seat adjusters. This is achieved by uniquely mounting a drive block bracket supporting the drive block connected to the lead screw in the upper track and passing a depending leg of the drive block bracket through a slot in the upper track and an aperture in the lower track to a fixed connection with the lower track. All of the operative horizontal drive components are housed within the upper track and do not extent above or outward from the upper track. In addition, the power seat adjuster of the present invention has a reduced manufacturing cost due to its simplicity.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
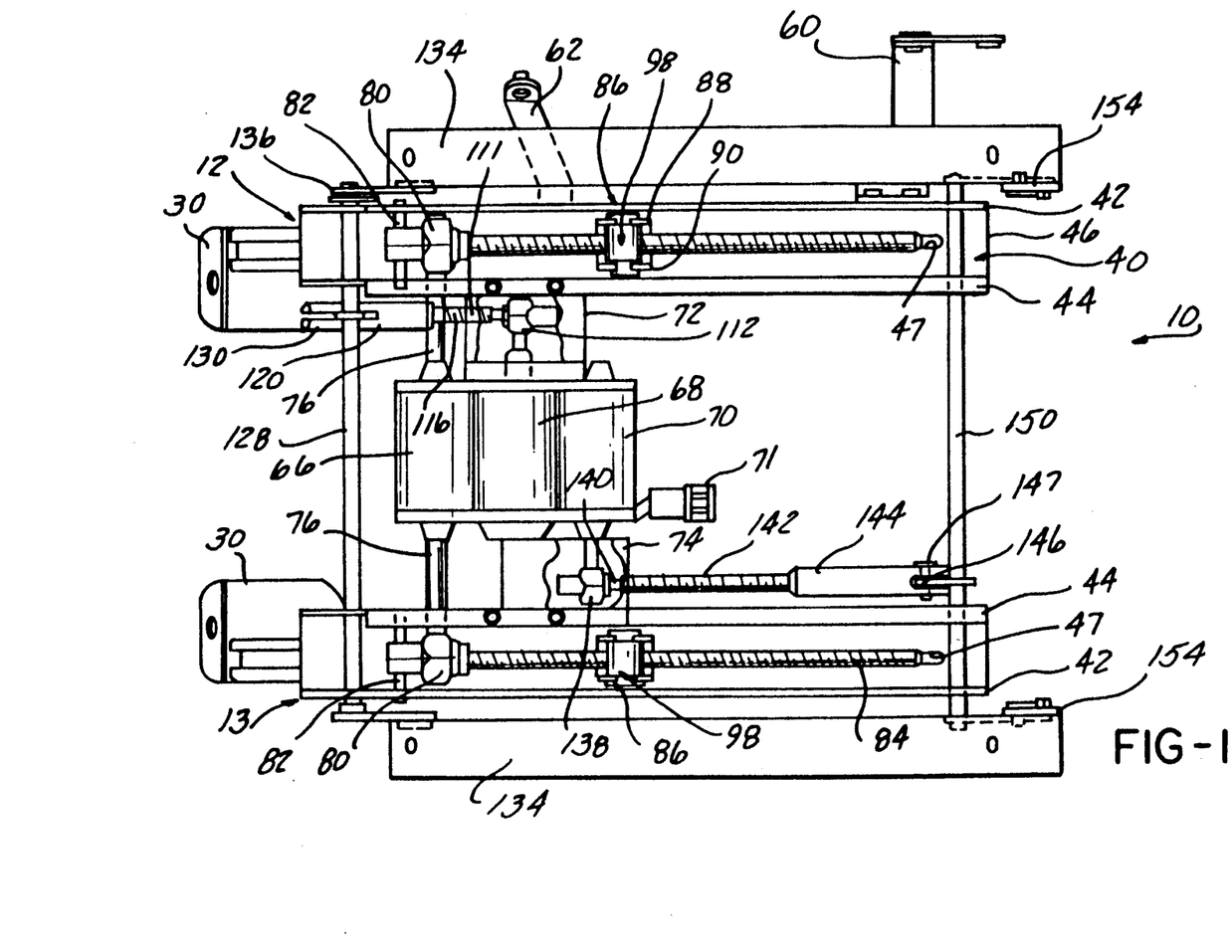
FIG. 1 is a plan view of a power seat adjuster of the present invention.

As shown in FIG. 1, there is depicted a power seat adjuster 10 which variably positions an automotive vehicle seat in any user selected position. The power seat adjuster 10 is a so-called "six-way" adjuster which provides horizontal fore and aft, and vertical up and down movement of separate front and rear ends of the seat. It will be understood, however, that the power seat adjuster described hereafter can be constructed with only horizontal fore and aft movement as well as any number of other movements, such as pivotal tilting of the seat back with respect to the seat bottom of a vehicle seat.

As shown in FIG. 1, the power seat adjuster 10 includes two track assemblies 12 and 13 which are disposed in a spaced apart manner and anchored to the floor of a vehicle, as described hereafter. As the track assemblies 12 and 13 are identically constructed as mirror images of each other, the following description will be provided only for track assembly 12. It will be understood that track assembly 13 is similarly constructed.

Figure 5:
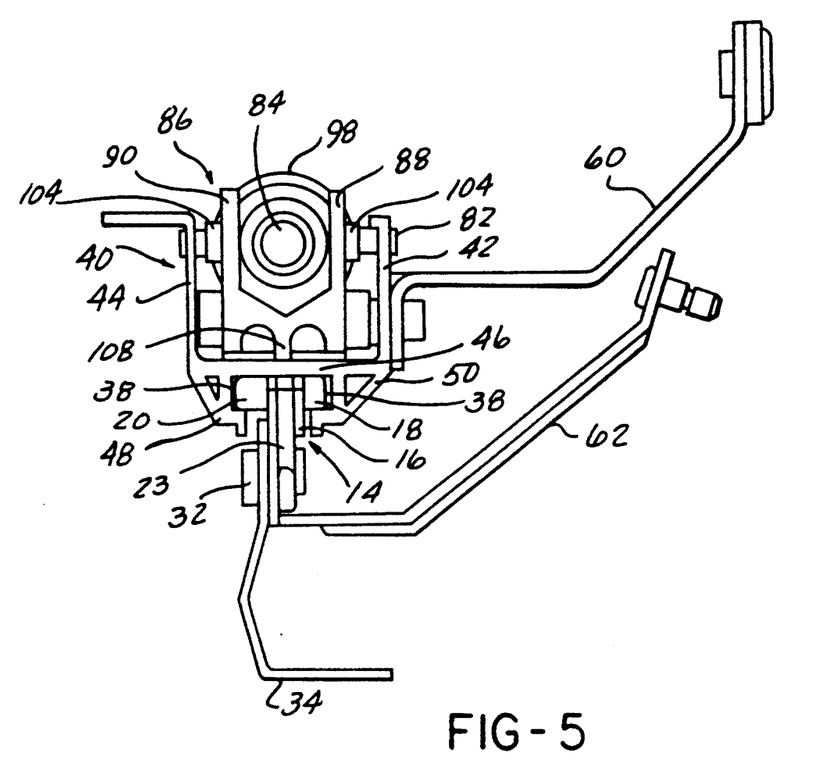
FIG. 5 is a right-hand end view of one of the track assemblies of the power seat adjuster shown in FIG. 1.
Figure 6:
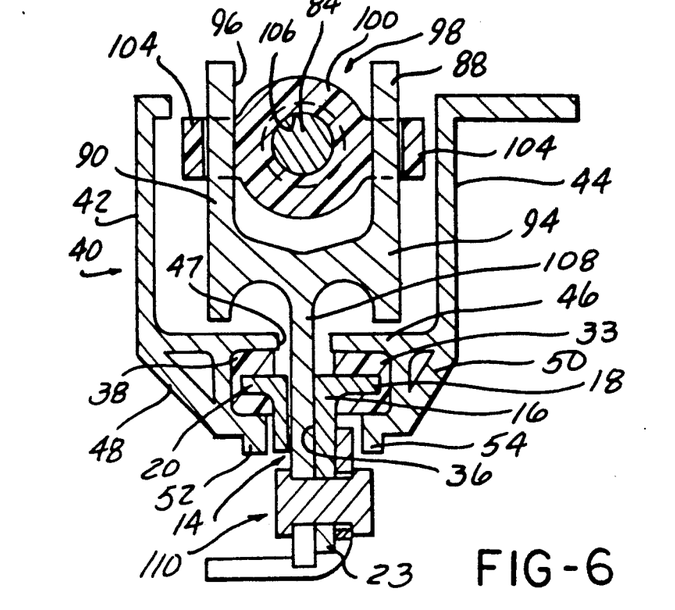
FIG. 6 is a cross sectional view generally taken along line 6—6 in FIG. 3.
Figure 7:
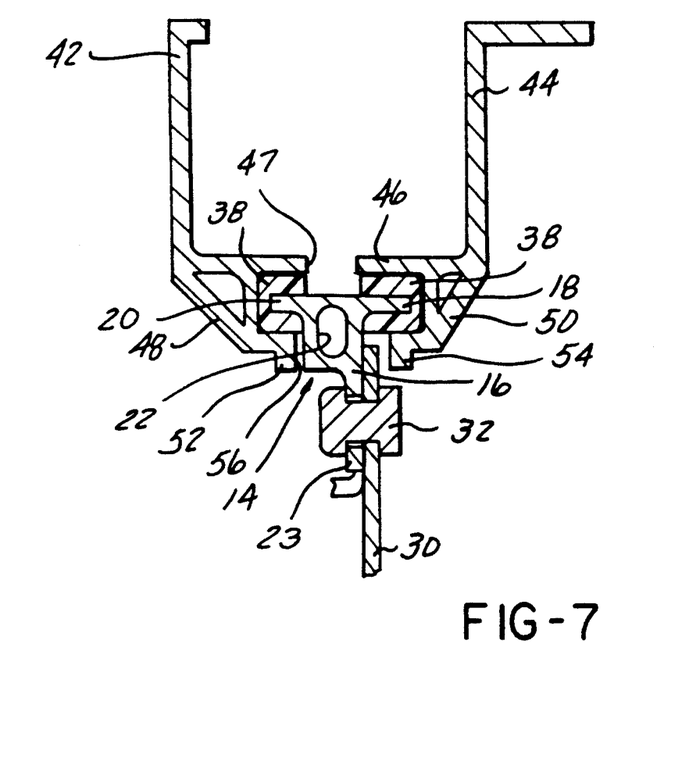
FIG. 7 is a cross sectional view generally taken along line 7—7 in FIG. 4.

The track assembly 12 includes a lower track 14 and an upper track 40 which is slidably movable thereover. As shown in FIGS. 5–7, the lower track 14 is formed with an upper portion 16 having first and second outwardly extending flanges 18 and 20 extending therefrom. A centrally located through bore 22 extends longitudinally through the upper portion 16 of the lower track 14. A leg 23 depends from the upper portion 16 and has a first or front end 26 and a second or rear end 28. A front riser 30 is connected by means of suitable fasteners, such as rivets 32, to the first end 26 of the leg 23 of the lower track 14. Similarly, a rear riser 34 is connected to the second or rear end 28 of the leg 23 by means of rivets 32. The risers 30 and 34 are anchored by means of suitable fasteners or anchors to the vehicle floor in a conventional manner to stationarily mount the lower track 14 to the vehicle floor.

As shown in FIGS. 5 and 6, a slot 36 is formed in and extends through the upper portion 16 of the lower track 14. The slot 36 is located intermediately between the first and second ends 26 and 28 of the lower track 14. The purpose of the slot or aperture 36 will be described in greater detail hereafter.

A pair of slide members 38 formed of a resilient material having a low co-efficient of friction are mounted about the flanges 18 and 20 of the upper portion 16 of the lower track 14 and conform with the exterior surface of the flanges 18 and 20 as shown in FIGS. 5, 6 and 7.

The track assembly 12 also includes the upper track 40 which is slidably mounted on the lower track 14. As shown in FIGS. 1–7, the upper track 40 includes a pair of opposed side walls 42 and 44. Upper flanges extend substantially horizontally from the upper end of the side walls 42 and 44. A central base 46 is integrally formed with and extends between lower ends of the side walls 42 and 44. A longitudinally extending, elongated slot 47 is formed in the base 46 and terminates in closed ends spaced from the ends of the upper track 40. Lower webs 48 and 50 extend below the base 46 and inward from the juncture of the side walls 42 and 44 and the base 46 and terminate in a pair of spaced flanges 52 and 54 which form a channel 56 therebetween.

As shown in FIGS. 5, 6 and 7, the flanges 52 and 54 of the webs 48 and 50, respectively, are spaced from the bottom wall 46 and form channels which receive the slide members 38 and the upper portion 16 and the flanges 18 and 20 of the lower track 14. The upper portion 16 and the depending leg 23 of the lower track 14 extend through the channel 56 formed between the depending flanges 52 and 54 of the upper track 40. In this manner, the upper track 40 is mounted to the lower track 14 for sliding, horizontal movement with respect to the lower track 14.

Both the lower track 14 and the upper track 40 are formed of an extruded, lightweight, high strength material, such as aluminum or aluminum alloy.

Rear and front lock bar brackets 60 and 62 are connected to the side wall 42 of the upper track 40 and the leg 23 of the lower track 14 as shown in FIGS. 1, 2, 3, 4 and 5. The rear and front lock bars 60 and 62 provide a connection for the vehicle seat belt harness in a conventional manner.

Referring again to FIG. 1, the power seat adjuster 10 of the present invention includes a first, horizontal drive means which is preferably in the form of a bi-directional electric drive motor 66. Also provided and described in greater detail hereafter are a first vertical drive means or motor 68 and a second vertical drive means or motor 70. An electrical connector 71 is provided for providing power and control signals to the motors 66, 68 and 70. The motors 66, 68 and 70 are arranged, by example, side-by-side and interconnected by end caps. The end caps are in turn securely connected to the opposed track assemblies 12 and 13 by means of mounting brackets 72 and 74.

The first or horizontal drive motor 66 has two drive shafts 76 extending outward from opposite ends thereof to the track assemblies 12 and 13. Each drive shaft 76, which may be a rigid, tubular member or a flexible cable, rotatably passes through an aperture 78 formed in one end of each of the upper tracks 40. The drive shaft 76 as provided with the track assembly 12 is connected to a horizontal drive transmission means 80 preferably in the form of a gear box. The gear box 80 is securely connected to the upper track 40 of the track assembly 12 by means of a roll pin 82 which extends between the side walls 42 and 44 of the upper track 40. The gear box 80 is movably mounted on the roll pin 82 so as to be able to move sideways or pivot a small amount.

The horizontal drive transmission means or gear box 80 is of conventional construction and, by way of example only, includes a worm and worm gear disposed within an exterior housing. The worm receives one end of the horizontal drive shaft 76 from the motor 66 and threadingly engages the worm gear which is formed about or mounted on one end of a horizontal drive lead screw 84. In this manner, the horizontal drive transmission means 80 serves to translate the rotation of the output shaft 76 of the horizontal drive motor 66 to rotation of the horizontal lead screw 84 which is oriented 90° with respect to the output shaft 76 of the drive motor 66. Further details of the construction of the drive transmission means may be had by referring to U.S. patent application Ser. No. 07/876,544, assigned to the assignee of the present invention, the contents of which are incorporated herein by reference. It will be understood that a similar drive transmission means 80 is also mounted in the opposed track assembly 13 and interconnected to the opposite output shaft 76 of the drive motor 66 and a second horizontal drive lead screw 84.

The lead screw 84 is an example of an extensible means used in the power seat adjuster 10 of the present invention which is stationarily coupled at one portion to the lower track coupler or horizontal drive block bracket 86 and has a second portion spaced from the one portion which is engaged by the horizontal drive means, such as the worm of the horizontal drive transmission means 80. The extensible means exhibits extensible movement with respect to its fixed connection to the lower track coupler or horizontal drive block bracket 86 so as to bi-directionally and horizontally move the portion of the extensible means engaged by the horizontal drive means to or away from the horizontal drive block bracket 86. Due to the fixed connection of the horizontal drive transmission means 80 to the upper track 40, this extensible movement of the extensible means results in sliding movement of the upper track 40 with respect to the lower track 14. It will be understood that means, other than the lead screw 84 and drive block 98, may also be employed in the power seat adjuster of the present invention to cause sliding movement of the upper track with respect to the lower track of each track assembly.

Figure 8:
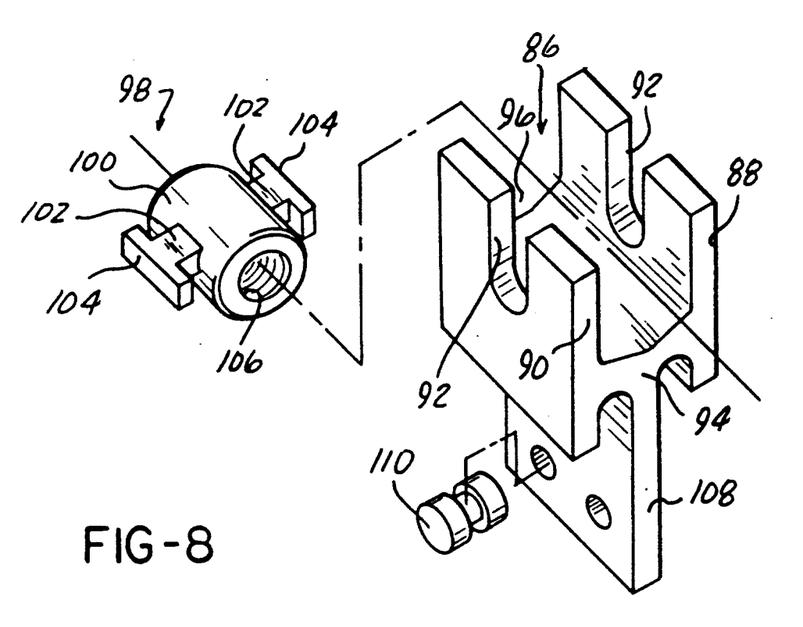
FIG. 8 is an enlarged, exploded, perspective view showing the drive block and drive block bracket mounted in the upper track shown in FIGS. 3 and 4.

As shown in FIGS. 1 and 8, a lower track coupler in the form of a horizontal drive block bracket 86 is mounted in the upper track 40. The drive block bracket 86 is formed with first and second side walls 88 and 90. An open ended slot 92 is formed in each side wall 88 and 90 and divides each of the side walls 88 and 90 into two separate portions. The side walls 88 and 90 are integrally connected by a central base 94 and form an open ended channel 96 extending through the drive block bracket 86.

A horizontal drive block or nut 98, which also forms a part of the lower track coupler, has a generally cylindrical housing 100 with a pair of outwardly extending flanges 102 extending from opposite sides thereof. The flanges 102 terminate in enlarged end flanges 104. The flanges 102 seat within the slots 92 in the drive nut mounting bracket 86 with the end flanges 104 being disposed exteriorly of the slots 92 and are spaced from the outer surfaces of the side walls 88 and 90 of the drive block mounting bracket 86 to mount the drive block 98 in the drive block mounting bracket 86. The small space between the end flanges 104 and the side walls 88 enables the drive block 98 to move sideways a small amount within the bracket 86 to follow any sideways movement of the lead screw 84. Alternately, the drive block 98 and the bracket 86 may be integrally formed as a one piece member.

A threaded internal bore 106 is formed in the housing 100 of the drive nut block 98 and threadingly receives the horizontal lead screw 84 therethrough in a threading, meshing engagement.

The drive block mounting bracket 86 includes a depending leg 108 which depends centrally from the base 94 of the bracket 86. The leg 108 extends through the slot 47 in the base 46 of the upper track 40 and through the aperture or slot 36 in the lower track 14 as shown in FIG. 6. The lower end of the leg 108 of the drive block mounting bracket 86 is disposed adjacent to the depending leg 23 of the lower track 14 and is secured thereto by means of suitable fasteners, such as rivets 110. In this manner, the drive block mounting bracket 86 is fixedly and stationarily connected to the lower track 14.

In operation, the drive block mounting bracket 86 due to its fixed and stationary connection to the lower track 14, stationarily supports the drive block 98 about the horizontal lead screw 84. Energization of the horizontal drive motor 66 for rotation of the output shaft 76 in one direction will cause the drive transmission means or gear box 80 to rotate the lead screw 84 in one direction. Since the drive block 98 is stationarily positioned and fixed to the lower track 14, rotation of the horizontal lead screws 84 in both of the track assemblies 12 and 13 will cause the upper tracks 40 of each of the track assemblies 12 and 14 to move horizontally in one direction depending upon the direction of rotation of the output shaft 76 of the horizontal drive motor 76. This enables the horizontal position of the upper tracks 40 of the track assemblies 12 and 13 to be adjusted by the user to any selectible horizontal fore or aft position. A reversal of the control signals to the horizontal drive motor 66 by way of a user activated switch will cause rotation of the output shaft 76 of the drive motor 66 in an opposite direction which will correspondingly result in rotation of the horizontal lead screws 84 in an opposite direction to cause movement of the upper tracks 40 of the track assemblies 12 and 13 in an opposite horizontal direction.

Figure 9:
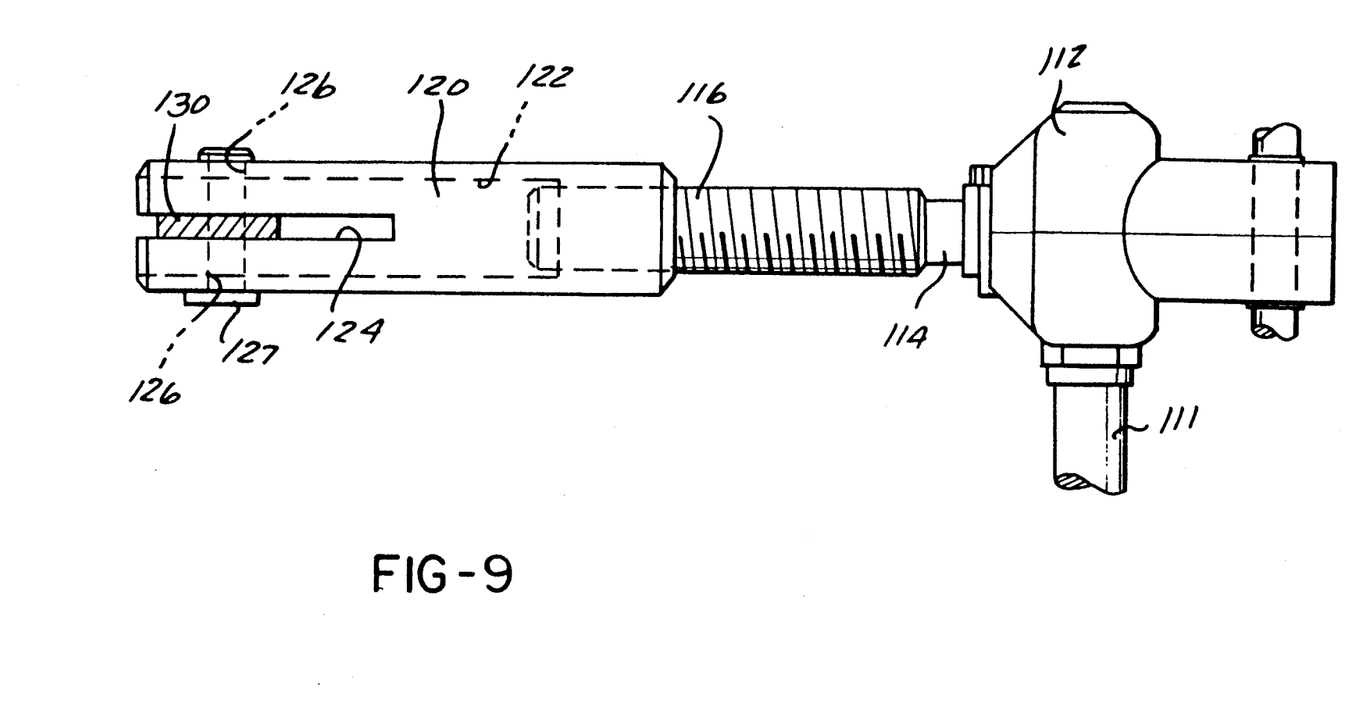
FIG. 9 is an enlarged, plan view of one of the vertical drives shown in FIG. 1.
Figure 10:
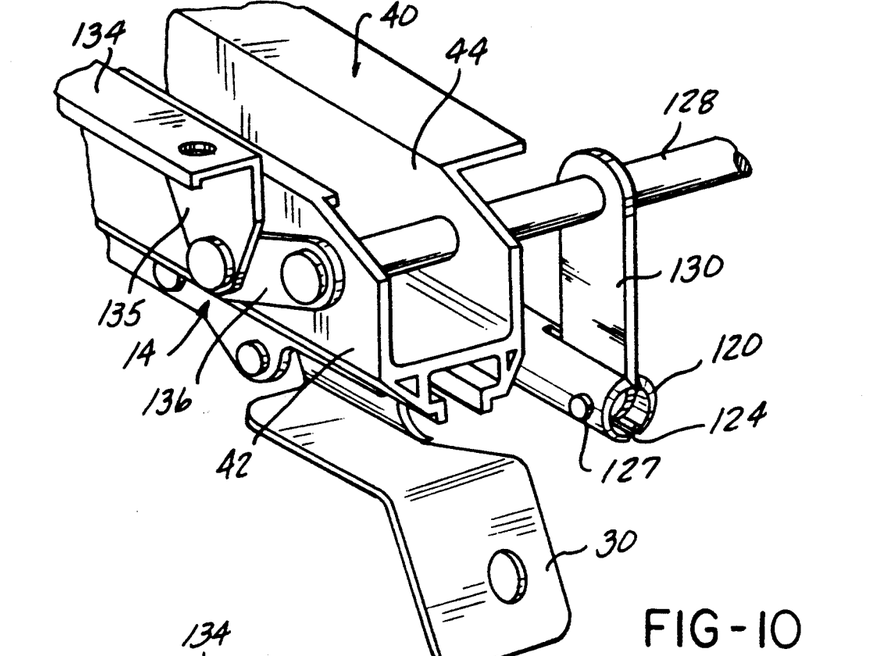
FIG. 10 is a partial, perspective view showing the interconnection of the first vertical drive to the upper track and the upper support plate.

As shown in FIGS. 1, 9 and 10, the power seat adjuster 10 of the present invention is also provided with means for vertically adjusting the position of the seat at any user selectable position or height. The first vertical drive motor 68 has an output shaft 111 rotatably coupled to a first or front vertical drive transmission means or gear box 112. The front vertical gear box has an output shaft 114 which is connected to a front lead drive screw 116 having external threads formed thereon. The front lead drive screw 116 engages a front tubular member 120 having an internally threaded bore 122 extending inward from one end. The tubular member 120 also has an open ended slot extending from an opposite end and passing completely through one end of the tubular member 120. Aligned bores 126 are formed in the opposite end of the tubular member 120 for receiving a pivot pin 127 therethrough, as described hereafter.

A front cross shaft 128, as shown in FIGS. 1 and 10, is rotatably mounted to and extends between the side walls 42 and 44 of the upper tracks 40 of each of the track assemblies 12 and 13. A first end of a front pivot link 130 is fixedly connected to the front cross shaft 128 by suitable means, such as by welding. The opposite end of the front pivot link 130 is pivotally connected to the tubular member 120 by means of the pivot pin 127 as shown in FIG. 10. In this manner, bi-directional rotation of the output shaft of the first vertical drive motor 68 is converted by means of the first or front vertical drive transmission means 112 to rotation of the front lead drive screw 116. Rotation of the front lead drive screw 116 causes linear movement of the tubular member 120 due to the threading interconnection of the lead screw 116 with the internal threads 122 in the tubular member 120. This linear movement of the tubular member 120 is converted to pivotal movement of the pivot link 130 about the end connected to the tubular member 120. Pivotal movement of the pivot link 130 thereby causes rotation of the front cross shaft 128 in one direction corresponding to one direction of rotation of the output shaft of the first vertical drive motor 68.

An upper seat mounting plate 134 is disposed adjacent to the upper track 40 and extends along the length of the upper track 40 as shown in FIGS. 1-4. The upper seat support plate 134 includes apertures for attachment to the seat bottom of a seat. A transfer link 136 is fixedly connected at one end by means of welding, for example, to the front cross shaft 128 as shown in FIG. 10. The opposite end of the transfer link 136 is pivotally connected by means of a pivot pin to an enlarged end portion or leg 135 at one end of the upper seat support plate 134. In this manner, rotation of the front cross shaft 128 as described above causes rotation of the transfer link 136 and a vertical movement of the upper seat support plate 134 with respect to the upper track 40 to any user selectible vertical position or height. It will be understood that a similar transfer link is connected to the opposite end of the front cross shaft 128 to cause pivotal movement of one end of the upper seat support plate 134 mounted on the opposed track assembly 13.

Figure 2:
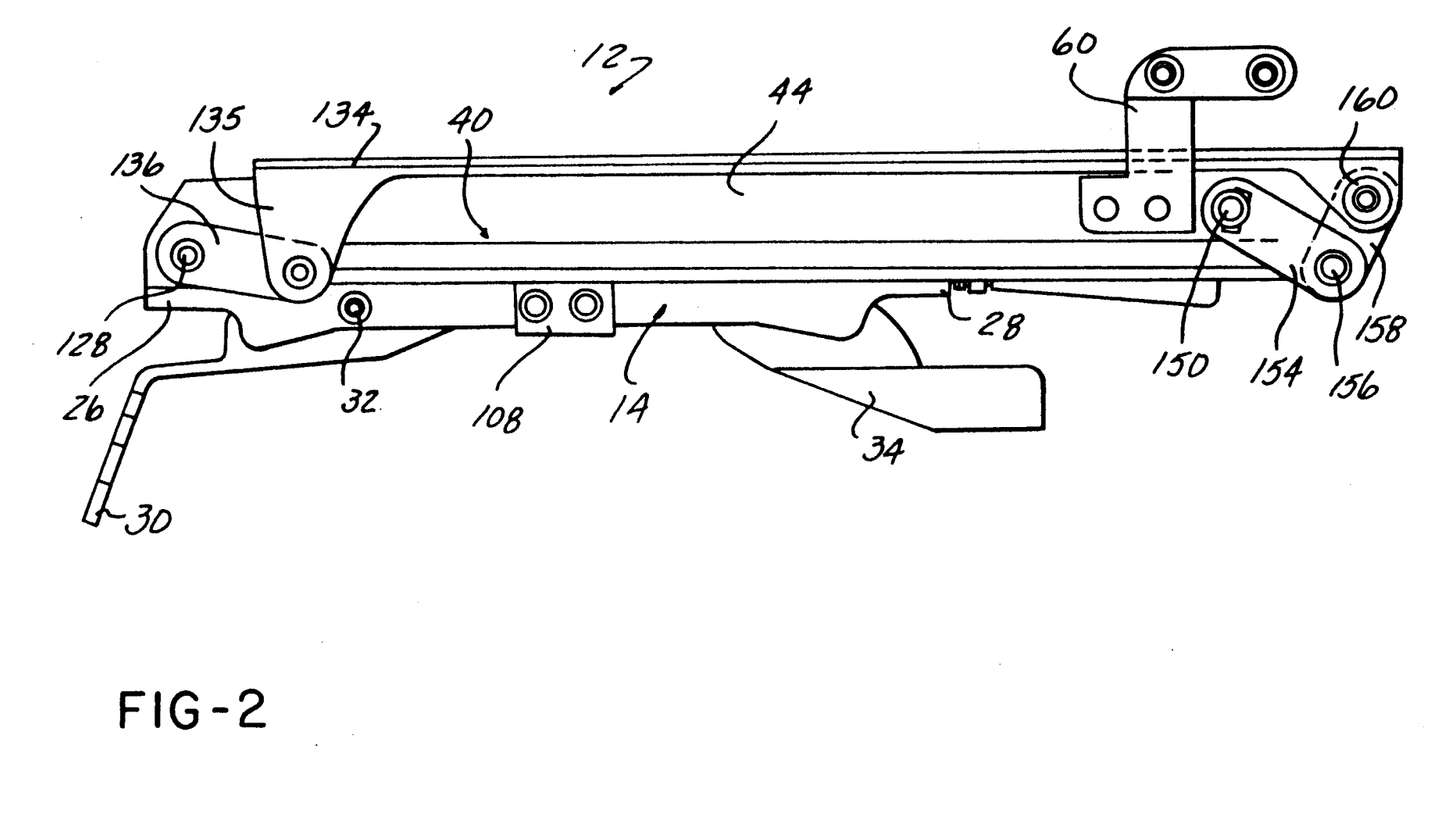
FIG. 2 is a side elevational view of the power seat adjuster shown in FIG. 1.
Figure 3:
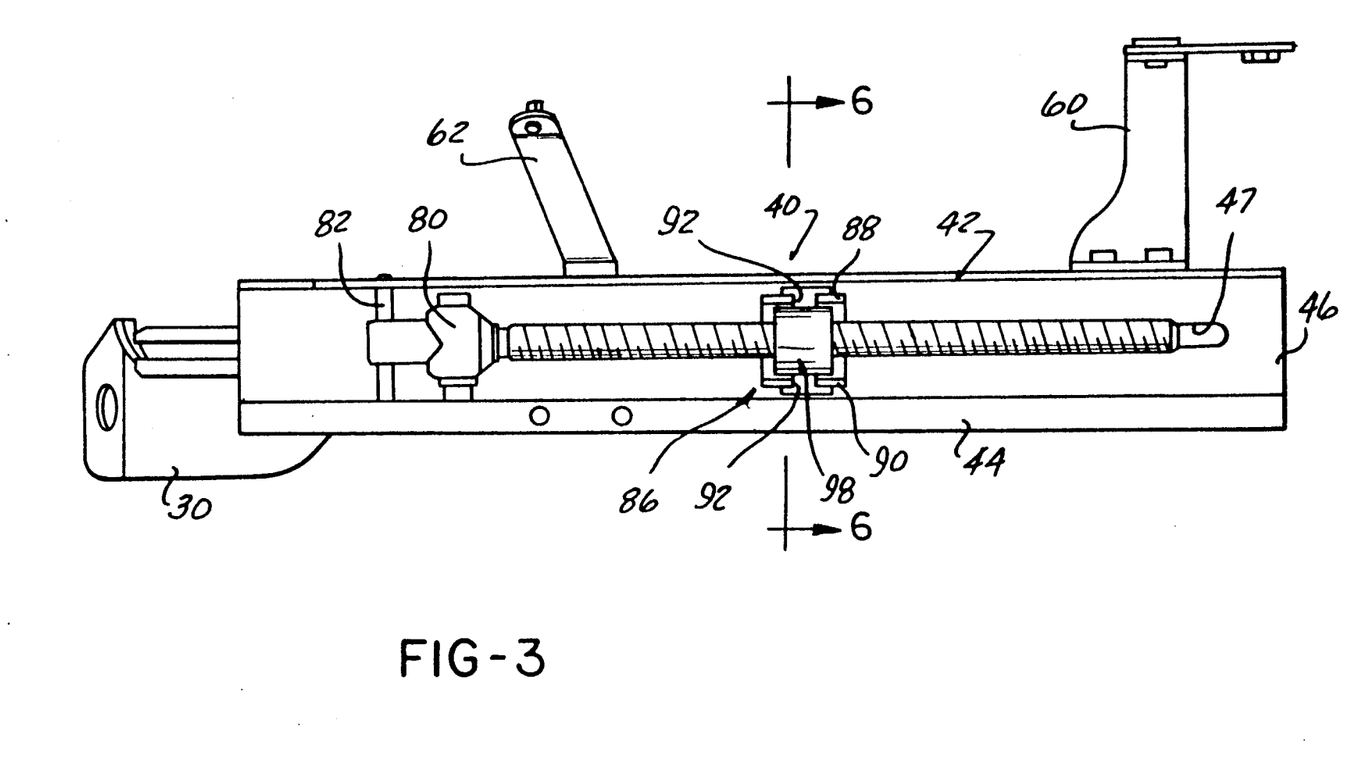
FIG. 3 is a plan view of one of the upper tracks of the power seat adjuster shown in FIG. 1.
Figure 4:
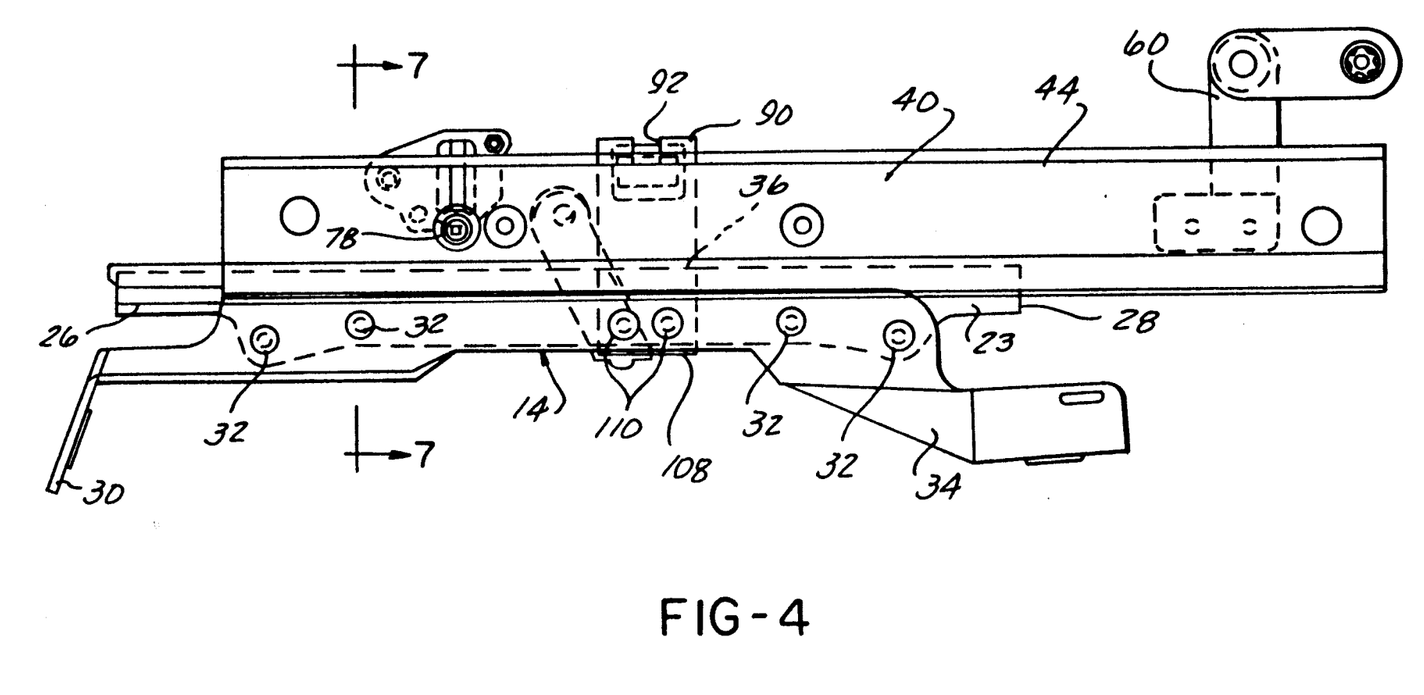
FIG. 4 is a side elevational view of an interconnected upper and lower tracks.
Figure 11:
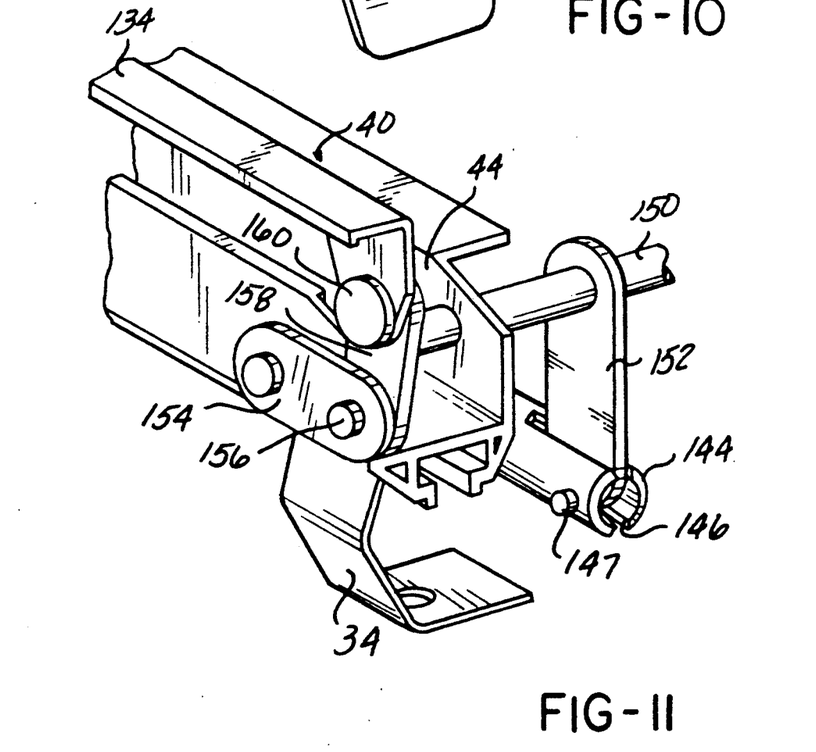
FIG. 11 is a partial, perspective view showing the interconnection of the second vertical drive to the opposite end of the upper track and the upper support plate.

A similar arrangement is provided at the opposite or rear end of the power seat adjuster 10 for vertically displacing the opposite or rear end of the upper seat support plates 134 of each of the track assemblies 12 and 13. As shown in FIGS. 1, 2 and 11, the second vertical drive motor 70 has an output shaft connected to a rear vertical drive transmission means or gear box 138. The drive shaft 140 is connected to an externally threaded lead screw 142 which threadably engages an internally threaded bore formed in a second or rear tubular member 144. The rear tubular member 144 has a through slot 146 formed at one end with a pair of aligned bores extending therethrough which receive a pivot pin 147.

A rear cross shaft 150 is rotatably mounted in and extends between the rear or opposed ends of the side walls 42 and 44 of the upper tracks 40 of the track assemblies 12 and 13. A rear pivot link 152 is fixedly connected at one end by suitable means, such as by welding, to the rear cross shaft 150 as shown in FIG. 11. The opposite end of the pivot link 152 is pivotally connected to the rear tubular member 144 by means of a pivot pin 147. In this manner, rotation of the output shaft of the second vertical drive motor 70 causes rotation of the rear lead screw 142 through the vertical transmission means or gear box 138. Due to the threaded engagement of the lead screw 142 with the rear tubular member 144, rotation of the lead screw 142 causes bi-directional linear movement of the tubular member 144 which effects a pivoting of one end of the pivot link 152. This causes rotation of the rear cross shaft 150 in one direction depending upon the direction of rotation of the output shaft of the second vertical drive motor 70.

The outer end of the rear cross shaft 150 is connected to a first transfer link 154 which is fixedly connected thereto at one end. The opposite end of the first transfer link 154 is pivotally connected by means of pivot pin 156 to a second transfer link 158. The opposite end of the second transfer link 158 is pivotally connected by means of pivot pin 160 to an enlarged end portion or leg at the rear end of the upper seat support plate 134. In this manner, rotation of the rear cross shaft 150, as described above, causes pivotal movement of the first transfer link 154 and a resultant pivoting of the second transfer link 158. Pivotal movement of the second transfer link 158 causes a vertical displacement of the rear end of the upper seat support plate 134 depending upon the direction of rotation of the output shaft of the second vertical drive motor 70.

It will be understood that the first and second vertical drive motors 68 and 70 may be energized separately to cause a tilting of the upper seat support plates 134 by means of raising or lowering one end of the upper seat support plates 134. This enables the user to select any desired angular position of the vehicle seat. In addition, the first and second vertical drive motors 68 and 70 may be energized in unison to raise or lower the upper seat support plates 134 regardless of the angular orientation of the upper seat support plates 134 between their first and second ends.

In summary, there has been disclosed a unique power seat adjuster which has a minimum vertical height compared to previously devised power seat adjusters. The power seat adjuster uniquely provides a connection for a drive block mounting bracket directly through a slot in an upper track and an aperture in a lower track to the lower track. This simplifies the construction of the power seat adjuster lowers its overall cost.

What is claimed is:

1. A power seat adjuster for a vehicle seat having a seat bottom displaceable horizontally between a plurality of selectible positions with respect to a vehicle floor, the power seat adjuster comprising:
- a pair of track assemblies mounted in a spaced apart relationship on a vehicle floor and supporting a seat bottom of a vehicle seat thereon, each track assembly including:
  - a lower track;
  - means connected to the lower track for stationarily securing the lower track to a vehicle floor;
  - an upper track slidably mounted on the lower track, a slot formed in and extending through the upper track;
  - a lower track coupler having a leg extending through the slot in the upper track and fixedly connected to the lower track;
  - extensible means, stationarily coupled at one portion to the lower track coupler for exhibiting extensible movement with respect to the lower track coupler; and
  - horizontal drive means, stationarily mounted to the upper track and having a rotatable output element engaged with the extensible means, for driving the extensible means with respect to the lower track coupler to bi-directionally move the upper track with respect to the lower track.

2. The power seat adjuster of claim 1 wherein the extensible means comprises a lead screw mounted in the upper track.

3. The power seat adjuster of claim 2 wherein the lower track coupler comprises:
- a drive block threadingly engaging the lead screw; and
- a drive block bracket mounted in the upper track and fixedly supporting the drive block, the drive block bracket having a leg extending through the slot in the upper track and fixedly connected to the lower track such that the drive block and the drive block bracket are stationarily fixed to the lower track and rotation of the lead screw upon rotation of the output element of the horizontal drive means causes horizontal movement of the upper track along the lower track.

4. The power seat adjuster of claim 1 wherein:
the slot in the upper track extends longitudinally along and through the upper track.

5. The power seat adjuster of claim 1 wherein the horizontal drive means comprises:
- an electric motor mounted to at least one of the track assemblies and having a pair of rotatable output shafts extending therefrom; and
- horizontal drive transmission means, fixedly mounted to each upper track and having the rotatable output element mounted thereon, one of the output shafts of the drive motor rotatably engaging the horizontal drive transmission means for rotating the output element thereof upon energization of the drive motor.

6. The power seat adjuster of claim 1 wherein the upper track comprises:
- a central base;
- a pair of side walls upstanding from the central base and, in conjunction with the central base, defining an interior channel extending longitudinally along the upper track; and
- the extensible means and the lower track coupler disposed in the channel in the upper track.

7. The power seat adjuster of claim 1 wherein each lower track comprises:
- an upper portion having opposed outwardly extending flanges; and
- a leg depending from the upper portion.

8. The power seat adjuster of claim 7 further comprising:
- an aperture formed in and extending through the upper portion of each lower track, the leg of the lower track coupler extending through the aperture and fixedly connected to the depending leg of the lower track.

9. The power seat adjuster of claim 6 further comprising:
- a pair of webs formed in each upper track and extending below the central base of each upper track, each web having a longitudinally extending channel formed therein slidably receiving one of the outwardly extending flanges of the lower track to slidably mount each upper track on a lower track.

10. The power seat adjuster of claim 1 wherein:
the upper track and the lower track of each track assembly are formed as extrusions of a lightweight, high strength material.

11. The power seat adjuster of claim 10 wherein the material is aluminum.

12. The power seat adjuster of claim 1 further including in each track assembly:
- an elongated plate disposed adjacent to the upper track of each track assembly and having first and second ends; and
- first and second vertical moving means for vertically moving the first and second ends of the plate, respectively, between a plurality of selectible vertical positions.

13. The power seat adjuster of claim 12 wherein the first vertical moving means comprises:
- a first shaft rotatably mounted in and extending between one end of each of the upper tracks of the pair of track assemblies;
- a first vertical drive means mounted between the pair of track assemblies and connected to the first shaft for bi-directionally rotating the first shaft; and
- a pair of first link means, each having opposite ends coupled between the first shaft and the first end of one the plates for transmitting rotation of the first shaft to vertical displacement of the first end of the plates with respect to the track assemblies.

14. The power seat adjuster of claim 13 further comprising:
- a second shaft rotatably mounted in and extending between the other end of each of the upper tracks of the pair of track assemblies;
- a second vertical drive means mounted between the pair of track assemblies and connected to the second shaft for bi-directionally rotating the second shaft; and
- a pair of second link means, each having opposite ends coupled between the second shaft and the second end of one of the plates for transmitting rotation of the second shaft to vertical displacement of the second end of the plates with respect to the track assemblies.

15. The power seat adjuster of claim 13 wherein the first vertical drive means includes:
- a third link fixedly connected at one end to the first shaft;
- a connector having first and second ends, the other end of the third link being rotatably connected to the first end of the connector;

the second end of the connector having an internally threaded bore extending therefrom;

a lead screw having an externally threaded end threadingly engaging the internal bore in the connector;

the first vertical drive means comprising a motor having a bi-directionally rotatable output shaft connected to the lead screw; and drive transmission means, connected to the output shaft of the motor and the lead screw, for transmitting rotation of the output shaft of the motor to rotation of the lead screw.

16. The power seat adjuster of claim 14 wherein the second vertical drive means includes:

a fourth link fixedly connected at one end to the first shaft;

a connector having first and second ends, the other end of the fourth link being rotatably connected to the first end of the connector;

the second end of the connector having an internally threaded bore extending therefrom;

a lead screw having an externally threaded end threadingly engaging the internal bore in the connector;

the first vertical drive means comprising a motor having a bi-directionally rotatable output shaft connected to the lead screw; and drive transmission means, connected to the output shaft of the motor and the lead screw, for transmitting rotation of the output shaft of the motor to rotation of the lead screw.

17. The power seat adjuster of claim 12 wherein the horizontal drive means and the first and second vertical moving means are attached to and movable with the upper track of each track assembly.

18. A power seat adjuster for a vehicle seat having a seat bottom displaceable horizontally between a plurality of selectible positions with respect to a vehicle floor, the power seat adjuster comprising:

a pair of track assemblies mounted in a spaced apart relationship on a vehicle floor and supporting a seat bottom of a vehicle seat thereon, each track assembly including:

a lower track, the lower track including:

an upper portion having opposed outwardly extending flanges;

a leg depending from the upper portion;

an aperture formed in and extending through the upper portion of each lower track; and means connected to the lower track for stationarily securing the lower track to a vehicle floor;

an upper track slidably mounted on the lower track, an elongated slot formed in and extending longitudinally along and through the upper track, the upper track including:

a pair of side walls upstanding from the central base and, in conjunction with the central base, defining an interior channel extending longitudinally along the upper track;

a pair of webs formed in each upper track and extending below the central base of each upper track, each web having a longitudinally extending channel formed therein slidably receiving one of the outwardly extending flanges of the lower track to slidably mount each upper track on a lower track;

horizontal drive transmission means fixedly mounted to the upper track;

a lead screw mounted on the upper track and connected to and bi-directionally rotated by the drive transmission means;

a drive block threadingly engaging the lead screw;

a drive block bracket fixedly supporting the drive block, the drive block bracket having a depending leg, the depending leg of the drive block bracket extending through the slot in the upper track and the aperture in the lower track and fixedly connected to the lower track such that the drive block and the drive block bracket are stationarily fixed with respect to the upper track and rotation of the lead screw by the drive transmission means causes sliding horizontal movement of the upper track along the lower track;

the lead screw, the horizontal drive transmission means, the drive block and the drive block bracket disposed in the channel in each upper track; and a horizontal drive motor, mounted between the pair of track assemblies and having a pair of rotatable drive shafts each connected to the drive transmission means on each upper track, for bi-directionally moving the upper tracks of each track assembly in unison.

19. The power seat adjuster of claim 18 further including:

a pair of seat support plates, each disposed adjacent to the upper track of each track assembly; and first and second vertical moving means, mounted to at least one of the track assemblies and connected to the first and second seat support plates, for vertically moving the first and second seat support plates with respect to the track assemblies.

20. A vehicle seat having an interconnected seat bottom and seat back displaceable horizontally between a plurality of selectible positions with respect to a vehicle floor, the vehicle seat comprising:

a pair of track assemblies mounted in a spaced apart relationship on a vehicle floor and supporting a seat bottom of a vehicle seat thereon, each track assembly including:

a lower track;

means connected to the lower track for stationarily securing the lower track to a vehicle floor;

an upper track slidably mounted on the lower track, an elongated slot formed in and extending longitudinally along and through the upper track;

a lower track coupler having a leg extending through the slot in the upper track and fixedly connected to the lower track;

extensible means, stationarily coupled at one portion to the lower track coupler, for exhibiting extensible movement with respect to the lower track coupler; and horizontal drive means, stationarily mounted to the upper track and having a rotatable output element engaged with the extensible means, for driving the extensible means with respect to the lower track coupler to bi-directionally move the upper track with respect to the lower track.

21. The vehicle seat of claim 20 wherein the extensible means comprises a lead screw mounted in the upper track.

22. The vehicle seat of claim 21 wherein the lower track coupler comprises:

a drive block threadingly engaging the lead screw; and a drive block bracket mounted in the upper track and fixedly supporting the drive block, the drive block bracket having a leg extending through the slot in the upper track and fixedly connected to the lower track such that the drive block and the drive block bracket are stationarily fixed to the lower track and rotation of the lead screw upon rotation of the output element of the horizontal drive means causes horizontal movement of the upper track along the lower track.

23. The vehicle seat of claim 20 wherein the slot in the upper track extends longitudinally along and through the upper track.

24. The vehicle seat of claim 20 wherein the horizontal drive means comprises:
an electric motor mounted to at least one of the track assemblies and having a pair of rotatable output shafts extending therefrom; and
horizontal drive transmission means, fixedly mounted to each upper track and having the rotatable output element mounted thereon, one of the output shafts of the drive motor rotatably engaging the horizontal drive transmission means for rotating the output element thereof upon energization of the drive motor.

25. The vehicle seat of claim 20 wherein the upper track comprises:
a central base;
a pair of side walls upstanding from the central base and, in conjunction with the central base, defining an interior channel extending longitudinally along the upper track; and
the extensible means and the lower track coupler disposed in the channel in the upper track.

26. The vehicle seat of claim 20 wherein each lower track comprises:
an upper portion having opposed outwardly extending flanges; and
a leg depending from the upper portion.

27. The vehicle seat of claim 26 further comprising:
an aperture formed in and extending through the upper portion of each lower track, the leg of the drive block bracket extending through the aperture and fixedly connected to the depending leg of the lower track.

28. The vehicle seat of claim 25 further comprising:
a pair of webs formed in each upper track and extending below the central base of each upper track, each web having a longitudinally extending channel formed therein slidably receiving one of the outwardly extending flanges of the lower track to slidably mount each upper track on a lower track.

29. The vehicle seat of claim 20 wherein:
the upper track and the lower track of each track assembly are formed as extrusions of a lightweight, high strength material.

30. The vehicle seat of claim 29 wherein the material is aluminum.

31. The vehicle seat of claim 20 further including in each track assembly:
an elongated plate disposed adjacent to the upper track of each track assembly and having first and second ends; and
first and second vertical moving means for vertically moving the first and second ends of the plate, respectively, between a plurality of selectible vertical positions.

32. The vehicle seat of claim 31 wherein the first vertical moving means comprises:
a first shaft rotatably mounted in and extending between one end of each of the upper tracks of the pair of track assemblies;
a first vertical drive means mounted between the pair of track assemblies and connected to the first shaft for bi-directionally rotating the first shaft; and
a pair of first link means, each having opposite ends coupled between the first shaft and the first end of one the plates for transmitting rotation of the first shaft to vertical displacement of the first end of the plates with respect to the track assemblies.

33. The vehicle seat of claim 32 further comprising:
a second shaft rotatably mounted in and extending between the other end of each of the upper tracks of the pair of track assemblies;
a second vertical drive means mounted between the pair of track assemblies and connected to the second shaft for bi-directionally rotating the second shaft; and
a pair of second link means, each having opposite ends coupled between the second shaft and the second end of one of the plates for transmitting rotation of the second shaft to vertical displacement of the second end of the plates with respect to the track assemblies.

34. The vehicle seat of claim 32 wherein the first vertical drive means includes:
a third link fixedly connected at one end to the first shaft;
a connector having first and second ends, the other end of the third link being rotatably connected to the first end of the connector;
the second end of the connector having an internally threaded bore extending therefrom;
a lead screw having an externally threaded end threadingly engaging the internal bore in the connector;
the first vertical drive means comprising a motor having a bi-directionally rotatable output shaft connected to the lead screw; and
drive transmission means, connected to the output shaft of the motor and the lead screw, for transmitting rotation of the output shaft of the motor to rotation of the lead screw.

35. The vehicle seat of claim 33 wherein the second vertical drive means includes:
a fourth link fixedly connected at one end to the first shaft;
a connector having first and second ends, the other end of the fourth link being rotatably connected to the first end of the connector;
the second end of the connector having an internally threaded bore extending therefrom;
a lead screw having an externally threaded end threadingly engaging the internal bore in the connector;
the first vertical drive means comprising a motor having a bi-directionally rotatable output shaft connected to the lead screw; and
drive transmission means, connected to the output shaft of the motor and the lead screw, for transmitting rotation of the output shaft of the motor to rotation of the lead screw.

36. The vehicle seat of claim 31 wherein the horizontal drive means and the first and second vertical moving means are attached to and movable with the upper track of each track assembly.

37. A vehicle seat having a seat bottom displaceable horizontally between a plurality of selectible positions with respect to a vehicle floor, the power seat adjuster comprising:

a pair of track assemblies mounted in a spaced apart relationship on a vehicle floor and supporting a seat bottom of a vehicle seat thereon, each track assembly including:

a lower track, the lower track including:
an upper portion having opposed outwardly extending flanges;
a leg depending from the upper portion;
an aperture formed in and extending through the upper portion of each lower track; and
means connected to the lower track for stationarily securing the lower track to a vehicle floor;

an upper track slidably mounted on the lower track, an elongated slot formed in and extending longitudinally along and through the upper track, the upper track including:
a pair of side walls upstanding from the central base and, in conjunction with the central base, defining an interior channel extending longitudinally along the upper track;

a pair of webs formed in each upper track and extending below the central base of each upper track, each web having a longitudinally extending channel formed therein slidably receiving one of the outwardly extending flanges of the lower track to slidably mount each upper track on a lower track;

horizontal drive transmission means fixedly mounted to the upper track;

a lead screw mounted on the upper track and connected to and bi-directionally rotated by the drive transmission means;

a drive block threadingly engaging the lead screw;

a drive block bracket fixedly supporting the drive block, the drive block bracket having a depending leg, the depending leg of the drive block bracket extending through the slot in the upper track and the aperture in the lower track and fixedly connected to the lower track such that the drive block and the drive block bracket are stationarily fixed with respect to the upper track and rotation of the lead screw by the drive transmission means causes sliding horizontal movement of the upper track along the lower track;

the lead screw, the horizontal drive transmission means, the drive block and the drive block bracket disposed in the channel in each upper track; and a horizontal drive motor, mounted between the pair of track assemblies and having a pair of rotatable drive shafts each connected to the drive transmission means on each track assembly for bi-directionally moving the upper tracks of each track assembly in unison.

38. The vehicle seat of claim 37 further including:
a pair of seat support plates, each disposed adjacent to the upper track of each track assembly; and
first and second vertical moving means, mounted to at least one of the track assemblies and connected to the first and second plates, for vertically moving the first and second plates with respect to the track assemblies.

* * * * *